United States Patent
Ikuno

(10) Patent No.: US 11,392,333 B2
(45) Date of Patent: Jul. 19, 2022

(54) DISCHARGE SYSTEM, IMAGE FORMING SYSTEM, METHOD, AND COMPUTER-READABLE STORAGE MEDIUM FOR REDUCING WASTE SHEETS

(71) Applicant: CANON KABUSHIKI KAISHA, Tokyo (JP)

(72) Inventor: Takao Ikuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/935,714

(22) Filed: Jul. 22, 2020

(65) Prior Publication Data
US 2021/0034310 A1 Feb. 4, 2021

(30) Foreign Application Priority Data
Aug. 2, 2019 (JP) .............................. JP2019-143312

(51) Int. Cl.
*G06F 3/12* (2006.01)

(52) U.S. Cl.
CPC ............ *G06F 3/1234* (2013.01); *G06F 3/121* (2013.01); *G06F 3/1219* (2013.01)

(58) Field of Classification Search
CPC ........... H04N 1/00663; H04N 1/00079; H04N 1/00029; H04N 1/00824; H04N 1/00082; H04N 1/00633; G06F 3/1234; G06F 3/121; G06F 3/1219
See application file for complete search history.

(56) References Cited

U.S. PATENT DOCUMENTS

| | | | | |
|---|---|---|---|---|
| 2011/0179961 A1* | 7/2011 | Yanagawa | .......... | H04N 1/00063 101/483 |
| 2015/0170011 A1* | 6/2015 | Hattori | .................. | G06F 3/1259 358/1.6 |
| 2018/0329352 A1* | 11/2018 | Yamashita | ........... | G03G 15/502 |
| 2018/0345693 A1* | 12/2018 | Prinsen | ................. | B65H 31/24 |
| 2019/0033765 A1* | 1/2019 | Haga | ................. | H04N 1/00641 |
| 2019/0138254 A1* | 5/2019 | Itou | ....................... | G06F 3/1282 |
| 2019/0149669 A1* | 5/2019 | Morita | ................. | G06F 3/1208 382/112 |

(Continued)

FOREIGN PATENT DOCUMENTS

| | | |
|---|---|---|
| JP | 2014144627 A | 8/2014 |
| JP | 2018192752 A | 12/2018 |

*Primary Examiner* — Juan M Guillermety
(74) *Attorney, Agent, or Firm* — Carter, DeLuca & Farrell LLP

(57) ABSTRACT

A discharge system includes: a reader unit configured to obtain read images corresponding to images of a plurality of pages by reading printed sheets of a printing job for printing the plurality of pages; a detection unit configured to detect a printing failure of each of the printed sheets using the read images; and a discharge unit configured to discharge each of the printed sheets in a discharge mode that depends on a detection result of the printing failure. The discharge unit discharges one or more printed sheets to a first discharge destination in a first discharge mode until the printing failure is detected, discharges a failure sheet in a second discharge mode in response to the printing failure being detected, and discharges a reprinted sheet on which the same page as the failure sheet is printed to the first discharge destination.

11 Claims, 9 Drawing Sheets

(56) References Cited

U.S. PATENT DOCUMENTS

| | | | |
|---|---|---|---|
| 2019/0238685 A1* | 8/2019 | Tsukamoto | H04N 1/00029 |
| 2019/0356789 A1* | 11/2019 | Oki | G06T 7/11 |
| 2020/0028976 A1* | 1/2020 | Oki | H04N 1/00084 |
| 2021/0014382 A1* | 1/2021 | Nakazawa | H04N 1/00037 |

* cited by examiner

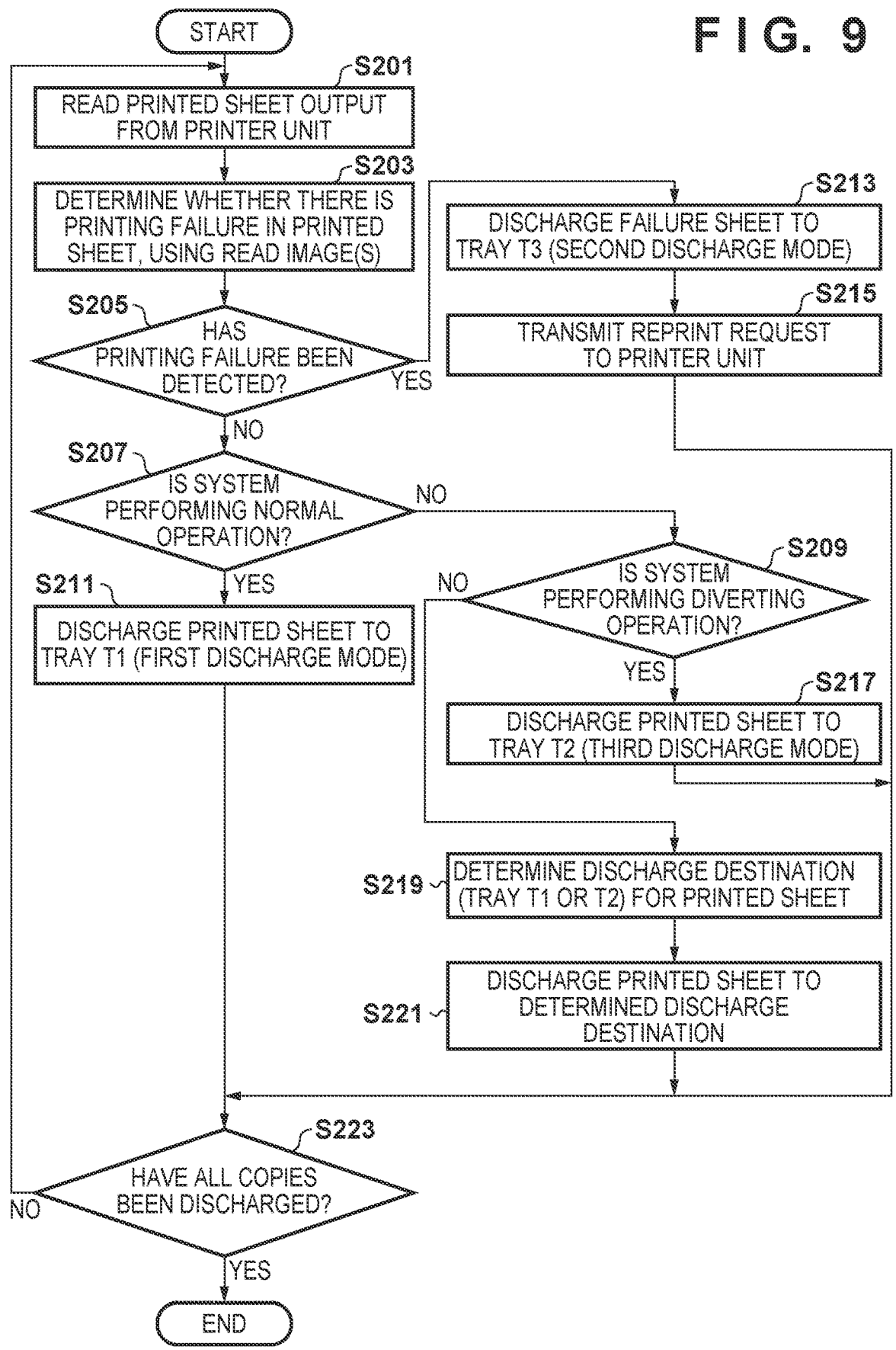

DISCHARGE SYSTEM, IMAGE FORMING SYSTEM, METHOD, AND COMPUTER-READABLE STORAGE MEDIUM FOR REDUCING WASTE SHEETS

BACKGROUND OF THE INVENTION

Field of the Invention

The present disclosure relates to a discharge system, an image forming system, a method, and a computer-readable storage medium.

Description of the Related Art

Image forming apparatuses such as a printer, a copy machine, and a multi-function peripheral discharge sheets on which images have been printed to a tray. In the case where a post-processing apparatus (also called a finisher) is attached to an image forming apparatus on the downstream side of the image forming apparatus, the post-processing apparatus performs processing operations such as, for example, sorting printed sheets to a plurality of trays, as well as stapling each copy, folding, bookbinding, and punching.

Some post-processing apparatuses have a verification function. The verification function detects a printing failure, using read images read from printed sheets. For example, if a read image of a page of a first copy is compared with a read image of the same page of a second copy, and a significant difference is found in the read image of the same page of the second copy, it is determined that the printed sheet of the page of the second copy has a printing failure. The sheet on which the printing failure has been detected is removed (purged). Japanese Patent Laid-Open No. 2014-144627 proposes simplifying the operation of removing a failure sheet by discharging a sheet on which a printing failure has been detected to a tray that is different from a tray used as a discharge destination of the immediately preceding sheet. Japanese Patent Laid-Open No. 2018-192752 proposes printing failure position information or displaying it on a display in order to notify a user of the position of a sheet in a printing job at which a printing failure was detected.

SUMMARY OF THE INVENTION

In the case of printing a printed material including a plurality of pages, if the verification function detects printing failures in some of the plurality of pages, the failure sheets are removed, and as a result, the entire copy including the failure sheets becomes incomplete. For example, in the case where a printed material including 10 pages is printed to make 20 copies, if a printing failure occurs on the third page of the fifth copy, the entire bundle of printed sheets of the fifth copy becomes incomplete. In this case, the user may, for example, reprint the third page to replace the failure sheet with the reprinted sheet, or reprint the entire fifth copy. Reprinting only the page on which the printing failure has occurred and replacing the failure sheet with the reprinted sheet require an operation of finding a specific sheet from a bundle of sheets. Accordingly, even if failure position information is informed to the user as disclosed in Japanese Patent Laid-Open No. 2018-192752, it would be a complex operation. On the other hand, reprinting the entire copy reduces the complexity of the operation, but instead, may create an unnecessary possibility of removing normally printed sheets.

For this reason, there is a need for a mechanism for reducing waste sheets as much as possible while reducing the effort of replacing a sheet if a printing failure is detected.

According to an aspect of the present disclosure, there is provided a discharge system including: a reader unit configured to obtain read images corresponding to images of a plurality of pages by reading printed sheets, the printed sheets being based on a printing job for printing the plurality of pages; a detection unit configured to detect a printing failure of each of the printed sheets using the read images; and a discharge unit configured to discharge each of the printed sheets in a discharge mode that depends on a detection result of the printing failure. The discharge unit is configured to: discharge one or more printed sheets to a first discharge destination in a first discharge mode until the printing failure is detected; discharge a failure sheet in a second discharge mode in response to the printing failure being detected; and discharge a reprinted sheet on which the same page as the failure sheet is printed to the first discharge destination.

Further features of the present invention will become apparent from the following description of exemplary embodiments (with reference to the attached drawings).

BRIEF DESCRIPTION OF THE DRAWINGS

FIG. 9 is a flowchart illustrating an example of a flow of discharge control processing according to the second example.

DESCRIPTION OF THE EMBODIMENTS

Figure 1:
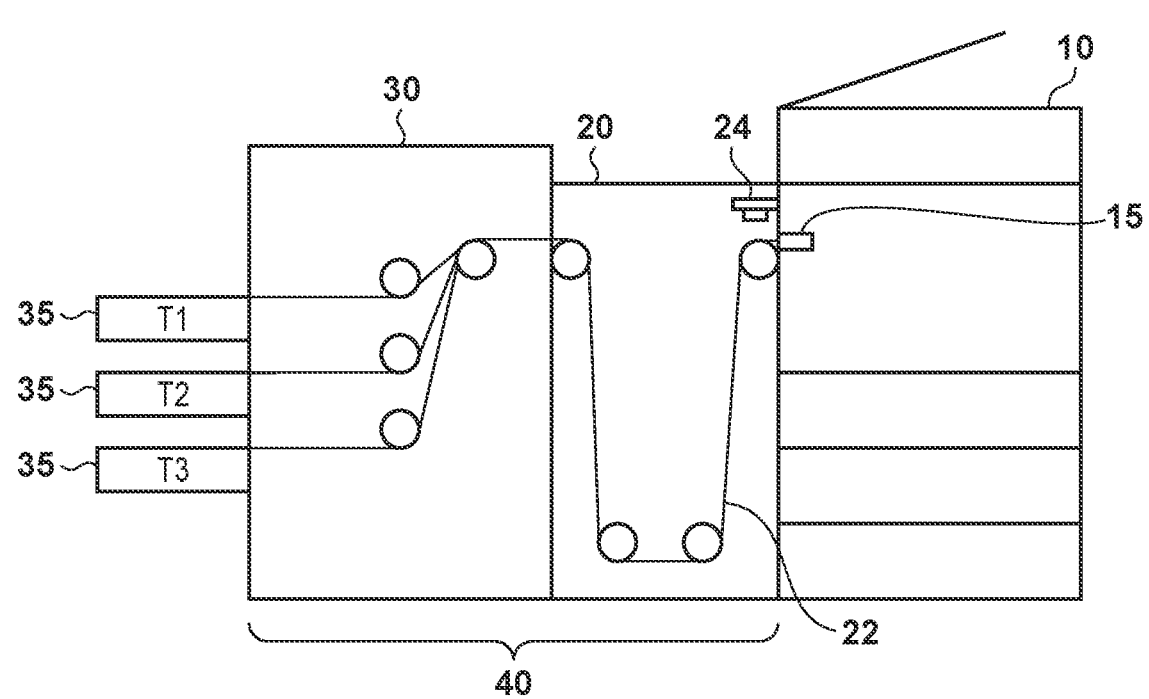
FIG. 1 is a block diagram showing an example of a configuration of a discharge system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

1. Configuration of System

In this section, an example will be mainly described in which the technique according to the present disclosure is applied to a system that includes a digital multi-function peripheral (MFP). However, in general, the technique according to the present disclosure is not limited to a multi-function peripheral, and is applicable to a system that includes an image forming apparatus (for example, a printer or a copy machine), or a post-processing system that is connected to such an image forming apparatus. Also, unless otherwise specified, the constituent elements described below such as apparatuses, devices, modules, and chips may be composed of a single entity or a plurality of physically different entities.

FIG. 1 is a block diagram showing an example of a configuration of a discharge system according to an embodiment. As can be seen from FIG. 1, a discharge system 1 includes a multi-function peripheral 10, a verification apparatus 20, and a discharge apparatus 30. The verification apparatus 20 and the discharge apparatus 30 constitute a post-processing system (also called a finisher) 40.

The multi-function peripheral 10 has a print function of printing (recording) an image onto a sheet based on a printing job. The multi-function peripheral 10 outputs a printed sheet on which an image has been printed by the print function to the verification apparatus 20 via an outlet 15. In the case where a printing job for printing a plurality of pages is designated, printed sheets of the plurality of pages are sequentially output through the outlet 15. In the specification of the present application, the term "page" refers to a processing unit that is printed onto a single sheet within one copy to be printed. For example, in the case of so-called two-in-one printing in which two images are printed onto one sheet, the number of pages is one. Likewise, the term "copy" refers to a processing unit that is printed at a time from one print target and does not include duplications of the same pages. One copy includes only one or more mutually independent pages, and two or more copies include duplications of the same pages.

The verification apparatus 20 has a check function of checking the print quality of a printed sheet output from the multi-function peripheral 10 by determining whether or not a printing failure has occurred in the output printed sheet. In the example shown in FIG. 1, the verification apparatus 20 includes a conveyance path 22 that conveys each printed sheet output from the outlet 15 of the multi-function peripheral 10 and a reader apparatus 24 that reads each printed sheet on the conveyance path 22. The reader apparatus 24 optically reads, for example, each printed sheet and obtains a read image of the printed sheet. As will be described in further detail later, the read images are used to detect a printing failure in the printed sheets.

The discharge apparatus 30 is configured unitarily with the verification apparatus 20. The discharge apparatus 30 has a discharge function (also called sort function) of discharging each printed sheet conveyed on the conveyance path 22 to one of one or more discharge destinations 35 depending on the result of verification performed by the verification apparatus 20. In the example shown in FIG. 1, the discharge apparatus 30 includes three discharge destinations 35. The discharge destinations 35 may be, but are not limited to, for example, trays. In the description given below, the three discharge destinations 35 will be referred to as a tray T1, a tray T2, and a tray T3, respectively. The number of discharge destinations 35 may be, of course, greater than or less than 3.

2. Specific Configuration of Each Apparatus

2-1. Multi-Function Peripheral

Figure 2:
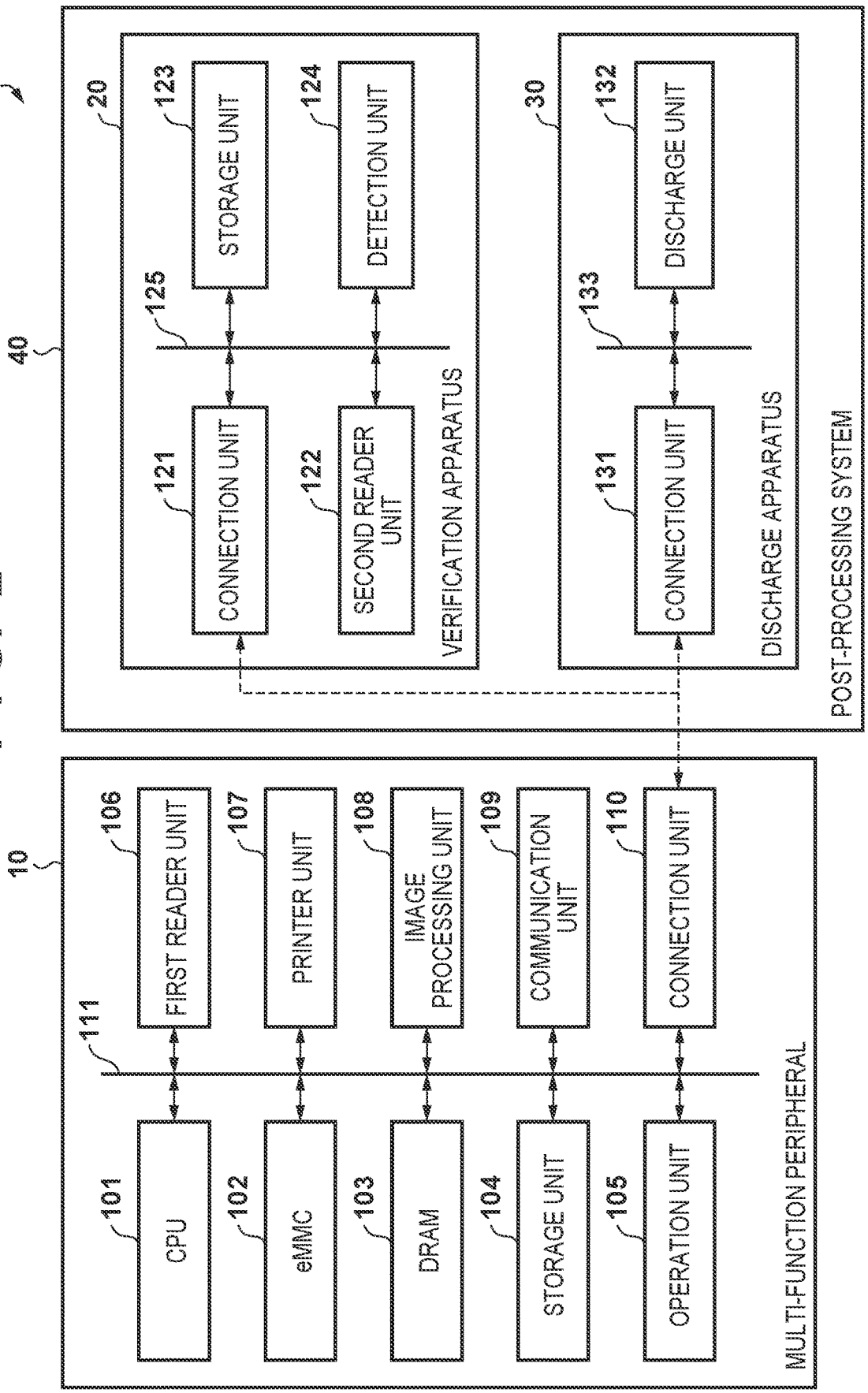
FIG. 2 is a block diagram showing an example of specific configurations of apparatuses included in the image forming system shown in FIG. 1.

FIG. 2 is a block diagram showing an example of specific configurations of apparatuses included in the discharge system 1 shown in FIG. 1. As can be seen from FIG. 2, the multi-function peripheral 10 includes a CPU 101, an eMMC 102, a DRAM 103, a storage unit 104, an operation unit 105, a first reader unit 106, a printer unit 107, an image processing unit 108, a communication unit 109, a connection unit 110, and a data bus 111.

The CPU (Central Processing Unit) 101 is a processor that controls all of the functions of the multi-function peripheral 10. The eMMC (embedded Multi-Media Card) 102 is a storage device in which one or more computer programs executed by the CPU 101 and data that are used by the programs are stored. The DRAM (Dynamic Random Access Memory) 103 is a primary storage device, and includes a volatile memory that temporarily stores program control variables and data such as image data to be processed therein during processing. The storage unit 104 is a secondary storage device such as, for example, a HDD (Hard Disk Drive), and includes a non-volatile memory in which various types of data including image data are permanently stored. The operation unit 105 provides a user interface that includes a display device that displays information regarding the multi-function peripheral 10 or the discharge system 1 and an input device that receives a user input. The first reader unit 106 is a scanner unit, and optically reads an original and obtains an image of the original. The printer unit 107 is a printer unit, and prints an image onto a sheet (also called recording paper) based on a printing job. The printing job may be, for example, a job that provides an instruction to copy an original read by the first reader unit 106, or a job that provides an instruction to print a document or other print targets received by the communication unit 109 from an external apparatus. In the case where the printer unit 107 is, for example, a laser printer unit, toner transferred to a sheet from a photoconductor drum is pressed by a heated fixing device, and thereby an image represented by the toner as a pattern is recorded on the sheet. However, the printer unit 107 is not limited to a laser printer unit, and may be, for example, any type of printer unit such as an inkjet printer unit. The image processing unit 108 is a processor dedicated to image processing. For example, in the case where image data to be printed is encoded, the image processing unit 108 decodes the image data. Also, the image processing unit 108 encodes an image obtained by the first reader unit 106 so as to transmit the encoded image to a storage or an external apparatus. The communication unit 109 is a communication interface for performing communication between the multi-function peripheral 10 and an external apparatus via a network. The connection unit 110 is a connection interface for connecting the post-processing system 40 to the multi-function peripheral 10. The multi-function peripheral 10 can exchange signals and data with the verification apparatus 20 and the discharge apparatus 30 via the connection unit 110. The data bus 111 is a line that mutually connects the CPU 101, the eMMC 102, the DRAM 103, the storage unit 104, the operation unit 105, the first reader unit 106, the printer unit 107, the image processing unit 108, the communication unit 109, and the connection unit 110.

2-2. Verification Apparatus

As can be seen from FIG. 2, the verification apparatus 20 includes a connection unit 121, a second reader unit 122, a storage unit 123, a detection unit 124, and a data bus 125.

The connection unit 121 is a connection interface for connecting the verification apparatus 20 to the multi-function peripheral 10 and the discharge apparatus 30. The second reader unit 122 corresponds to the reader apparatus 24 shown in FIG. 1, and obtains a read image by reading a printed sheet printed by the multi-function peripheral 10. In the case of printing a plurality of pages, the second reader unit 122 sequentially reads printed sheets of the plurality of pages, and obtains read images that respectively correspond to the pages. The storage unit 123 is a storage device in which read images of the printed sheets obtained by the second reader unit 122 are stored. The detection unit 124 may be a processor that implements the check function of the verification apparatus 20 that was described with reference to FIG. 1. In the present embodiment, the detection unit 124 detects a printing failure in the printed sheets, using the read images obtained by the second reader unit 122. For example, if a read image corresponding to a printed sheet includes a stain or positional displacement, the detection unit 124 may determine that the printed sheet is a failure sheet (a sheet in which there is a printing failure). Also, in the case where M copies are printed (where M>1), the detection unit 124 may determine the presence of a printing failure by comparing the read images of the printed sheets of the same page of different copies. In this case, for example, read image data of the pages of the first copy is stored in the storage unit 123 as sample data, and the detection unit 124 may compare read images of the printed sheets of the second and subsequent copies with the corresponding images represented by the sample data. The detection unit 124 may transmit detection result information indicating whether or not a printing failure has been detected in each individual sheet to the multi-function peripheral 10 and the discharge apparatus 30 via the connection unit 121. The data bus 125 is a line that mutually connects the connection unit 121, the second reader unit 122, the storage unit 123, and the detection unit 124.

2-3. Discharge Apparatus

As can be seen from FIG. 2, the discharge apparatus 30 includes a connection unit 131, a discharge unit 132, and a data bus 133.

The connection unit 131 is a connection interface for connecting the discharge apparatus 30 to the multi-function peripheral 10 and the verification apparatus 20. The discharge unit 132 may be a processor that implements the discharge function of the discharge apparatus 30 that was described with reference to FIG. 1. In the present embodiment, in a discharge mode that depends on a detection result of a printing failure informed from the verification apparatus 20, the discharge unit 132 discharges each printed sheet to one of the one or more discharge destinations 35. The discharge mode mentioned here may include at least one of the following settings: to which discharge destination 35 the sheet is discharged; and a shift of the discharge position in the selected discharge destination. Typically, two or more different discharge modes may be defined in such a way that a plurality of sheets discharged in different modes can be distinguished from each other by a user. Sorting printed sheets, or in other words, discharge control that depends on a detection result of a printing failure, performed by the discharge unit 132, will be described in further detail in the next section. The data bus 133 is a line that mutually connects the connection unit 131 and the discharge unit 132.

3. Details of Discharge Control 3-1. Comparative Examples

A few comparative examples will be described before a detailed description is given of the discharge control performed in the discharge system 1 described in the preceding section.

(1) First Comparative Example

Figure 3:
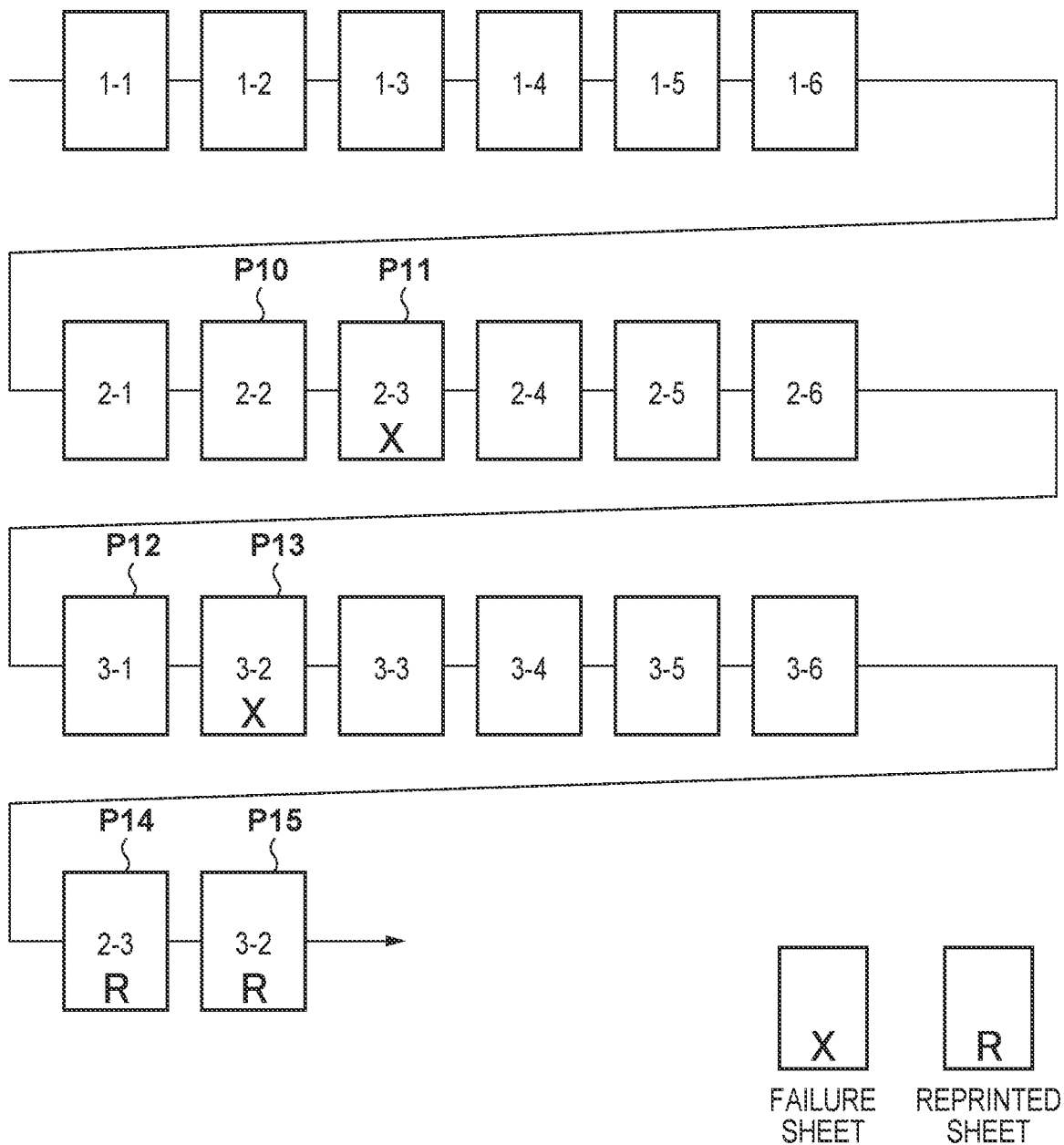
FIG. 3 is an illustrative diagram showing an example of a sheet discharge order according to a first comparative example.

For example, if a printing failure is detected while a print target including a plurality of pages is being printed to make a plurality of copies, simply, a reprinted sheet on which the same page as the failure sheet is printed may be output at the end of the printing job. FIG. 3 shows an example of a sheet discharge order according to a first comparative example as described above.

In FIG. 3, the arrow extending from left to right and from up to down represents a continuous sheet discharge order. Each rectangular box represents one printed sheet. The label "i-j" assigned to each sheet (box) indicates that the sheet is the j-th page of the i-th copy. The letter "X" assigned to a sheet indicates that the sheet has been detected as a failure sheet. The letter "R" assigned to a sheet indicates that the sheet is a reprinted sheet.

In the example shown in FIG. 3, it is assumed that a print target including a total of 6 pages is printed to make 3 copies. First, printing is performed normally up to a sheet P10 that is the second page of the second copy, and after that, a printing failure is detected in a sheet P11 that is the third page of the second copy. Next, printing is performed normally up to a sheet P12 that is the first page of the third copy, and after that, a printing failure is detected in a sheet P13 that is the second page of the third copy. Next, printing is performed up to the last page of the third copy. Finally, a reprinted sheet P14 of the third page of the second copy and a reprinted sheet P15 of the second page of the third copy are printed and discharged.

When reprinting finishes, the user replaces the failure sheet P11 with the reprinted sheet P14. Also, the user replaces the failure sheet P13 with the reprinted sheet P15. As a result, complete bundles of the second and third copies are obtained. However, the operation of finding the failure sheets P11 and P13 from a bundle of sheets stacked in one tray and correctly replacing the failure sheets P11 and P13 with the reprinted sheets is complex and imposes a large burden on the user. In order to avoid the complexity of the replacing operation, the user may discard incomplete bundles of the second and third copies and reprint the second and third copies, but such a reprinting operation creates an unnecessary possibility of removing normally printed sheets.

(2) Second Comparative Example

Figure 4:
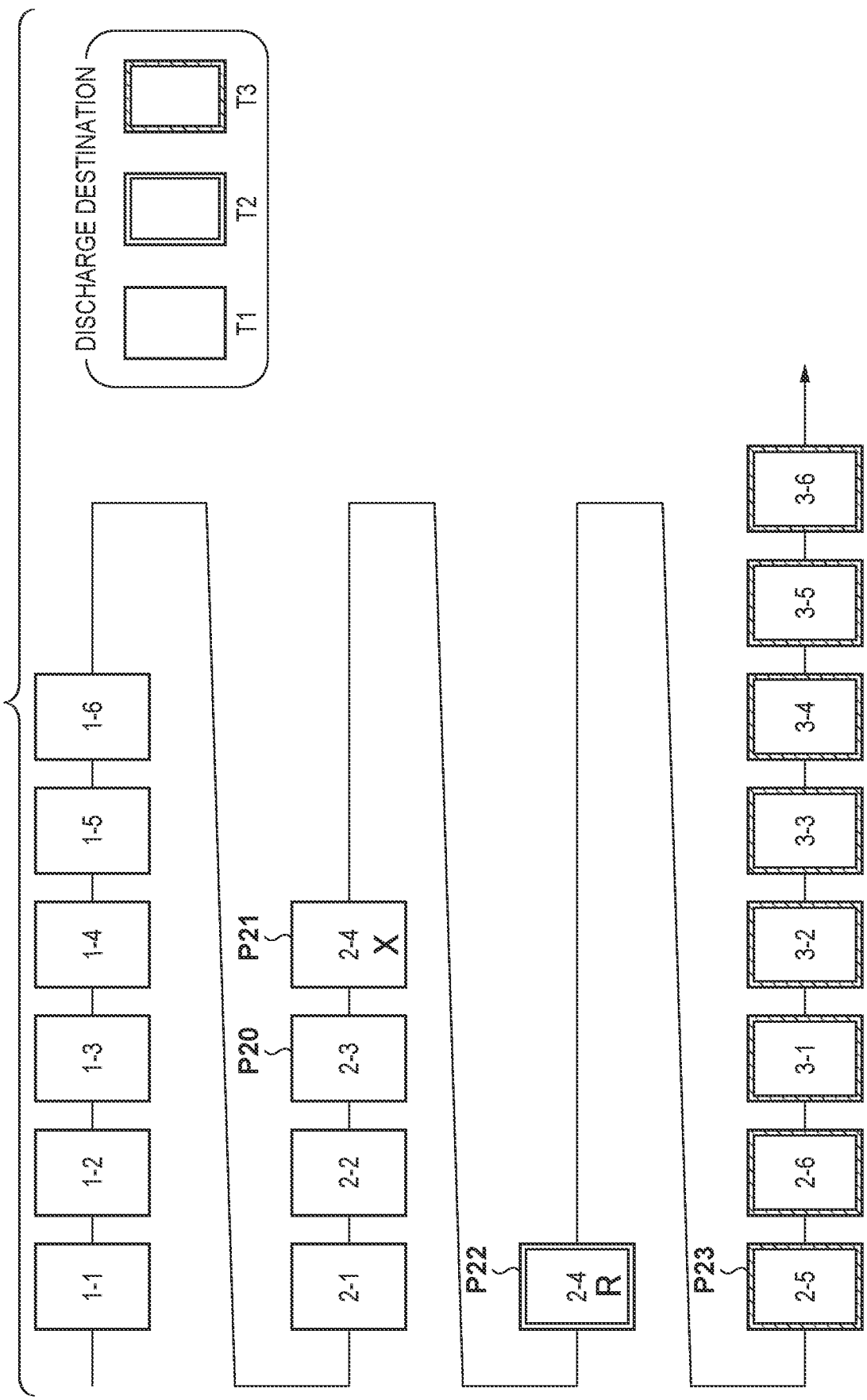
FIG. 4 is an illustrative diagram showing an example of a sheet discharge order according to a second comparative example.

As another example, the operation of removing failure sheets may be simplified by, if a printing failure is detected during printing, switching the discharge destination and discharging subsequent sheets to the switched discharge destination. FIG. 4 shows an example of a sheet discharge order according to a second comparative example as described above.

In the example shown in FIG. 4 as well, it is assumed that a print target including a total of 6 pages is printed to make 3 copies. First, printing is performed normally up to a sheet P20 that is the third page of the second copy, and the printed sheets are discharged to the tray T1. Next, a printing failure is detected in a sheet P21 that is the fourth page of the second copy. The failure sheet P21 is also discharged to the tray T1. In response to the printing failure being detected, the discharge destination is switched from the tray T1 to the tray T2. Next, the same page as the failure sheet P21 is reprinted, and a reprinted sheet P22 is discharged to the tray T2. Furthermore, the discharge destination is switched from the tray T2 to the tray T3. Next, a sheet P23 that is the fifth page of the second copy and subsequent sheets are printed and discharged to the tray T3.

In the second comparative example, the failure sheet P21 is present on top of the tray T1, and only the reprinted sheet P22 is present in the tray T2, and thus the user can relatively easily replace the failure sheet P21 with the reprinted sheet P22. However, because the bundle of the second copy on the tray T1 is incomplete, the user has to find the remaining printed sheets of the second copy from the tray T3 and supplement the bundle of the second copy. Accordingly, it cannot be said that the second comparative example sufficiently reduces the complexity of the user operation upon detection of a printing failure. In order to avoid the complexity, the user may entirely remove the incomplete bundle of the second copy. In addition, with a device that prints a plurality of sheets at a high speed, a situation may occur in which at the point in time when a printing failure is detected, a few subsequent sheets are already printed, and it is therefore structurally difficult for the device to, immediately after discharging the failure sheet, discharge a reprinted sheet on which the same page as the failure sheet is printed.

3-2. Embodiment Examples

The discharge system 1 according to the present embodiment overcomes one or more of the problems described in the comparative examples given above, using a mechanism described below.

In two embodiment examples described below, the discharge system 1 discharges one or more printed sheets to a first discharge destination in a first discharge mode until a printing failure is detected. Also, the discharge system 1 discharges a failure sheet in a second discharge mode in response to a printing failure being detected. Then, the discharge system 1 discharges a reprinted sheet on which the same page as the failure sheet is printed to the first discharge destination. As a result, the user can easily find the failure sheet based on the difference in the discharge mode. Furthermore, the reprinted sheet is discharged to the first discharge destination that is the destination originally designated, and it is therefore easy for the user to obtain a complete bundle of sheets that belong to the same copy. The two embodiment examples described below provide further advantages specific thereto.

(1) First Embodiment Example

In a first embodiment example, it is assumed that the discharge apparatus 30 has a shift discharge function, which is capable of discharging sheets to some different positions in the same discharge destination 35. The first discharge mode is a mode in which sheets are discharged to a first discharge position in the first discharge destination, and the second discharge mode is a mode in which sheets are discharged to a second discharge position shifted from the first discharge position in the first discharge destination. Failure sheets are shift-discharged to a discharge position that is different from the discharge position to which normally printed sheets are discharged, and thus the user can easily find the failure sheets.

Also, in this embodiment example, the discharge unit 132 may discharge reprinted sheets in a third discharge mode. The third discharge mode is a mode in which sheets are discharged to a third discharge position shifted from the first discharge position in a different direction or by a different shift amount than that of the second discharge position. Accordingly, reprinted sheets are shift-discharged to a discharge position that is different from the discharge positions to which normally printed sheets and failure sheets are discharged. Thus, the user can easily find a reprinted sheet and replace a failure sheet with the reprinted sheet.

Also, in this embodiment example, in the case where M copies (where M>1) are designated for printing, if a printing failure is detected while the N-th copy is being discharged (where N<M), the discharge unit 132 may discharge a reprinted sheet immediately after discharging a printed sheet of the last page of the N-th copy. In this case, the reprinted sheet is discharged at a timing between printing of a copy and printing of a subsequent copy, instead of being discharged after all of the copies have been printed as in the first comparative example or being discharged subsequent to a detected failure sheet as in the second comparative example. Accordingly, even if a printing failure occurs, the user can simply extract sheets of each copy from a bundle of stacked sheets and obtain each complete copy by performing a separate operation for the each individual copy.

Figure 5:
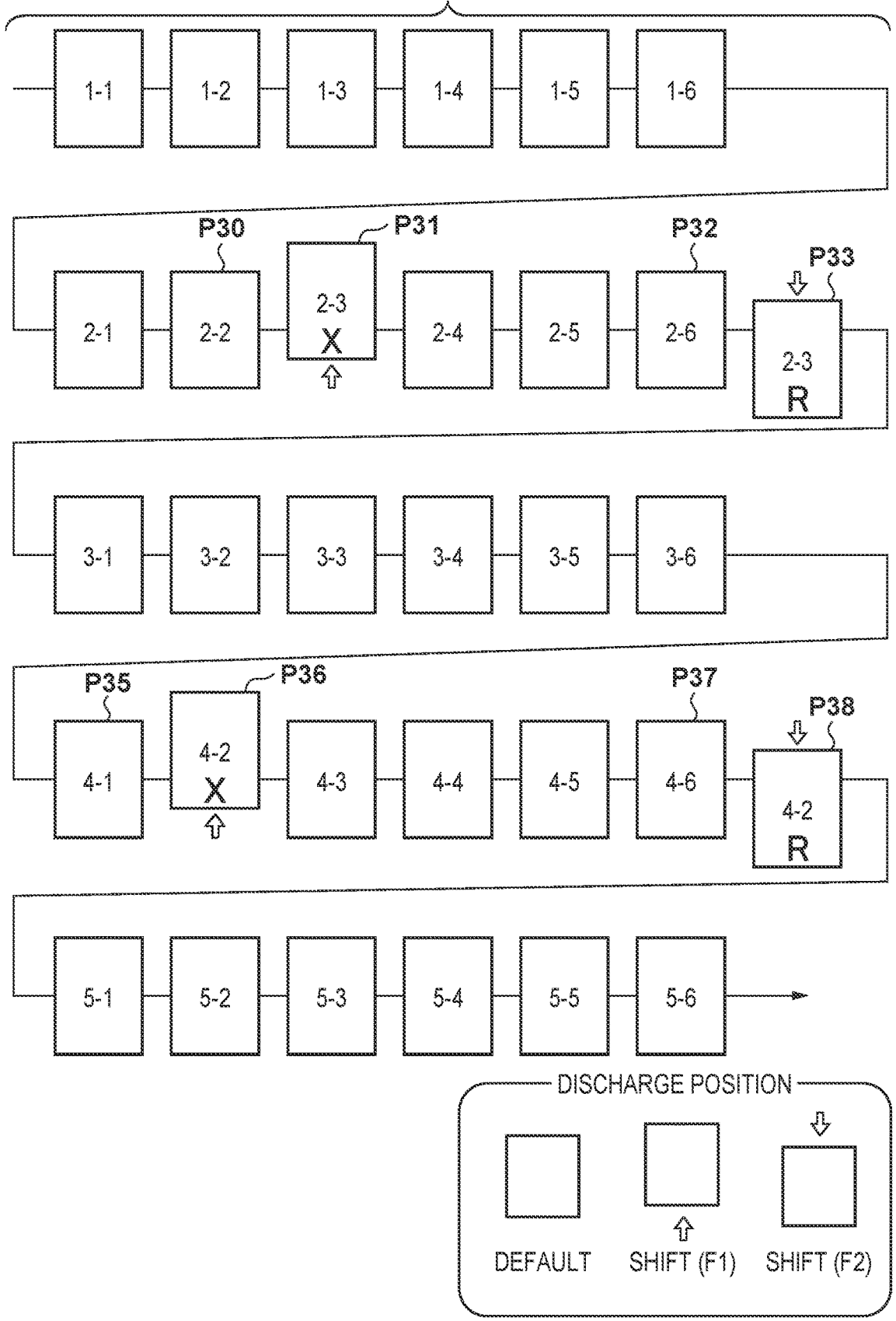
FIG. 5 is an illustrative diagram showing an example of a sheet discharge order and a discharge mode according to a first embodiment example.

FIG. 5 shows an example of a sheet discharge order and a discharge mode according to the first embodiment example. In FIG. 5, an upward arrow shown below a sheet indicates that the sheet is shift-discharged in the second discharge mode. Likewise, a downward arrow shown above a sheet indicates that the sheet is shift-discharged in the third discharge mode. The sheets without the arrows are discharged to a default discharge position in the first discharge mode. The sheets are all discharged to the tray T1.

In the example shown in FIG. 5, it is assumed that a print target including a total of 6 pages is printed to make 5 copies (where M=5). First, printing is performed normally up to a sheet P30 that is the second page of the second copy, and the printed sheets are discharged in the first discharge mode. Next, a printing failure is detected in a sheet P31 that is the third page of the second copy. The failure sheet P31 is discharged, in the second discharge mode, to a discharge position which is different from the discharge position the printed sheet P30 was discharged. After that, printing is performed normally up to a sheet P32 that is the sixth page of the second copy, and the printed sheets are discharged in the first discharge mode. Next, the same page as the failure sheet P31 is reprinted, and a reprinted sheet P33 is discharged, in the third discharge mode, to a discharge position which is different from the discharge positions to which the failure sheet P31 and the printed sheet P32 were discharged.

Furthermore, printing is performed normally up to a sheet P35 that is the first page of the fourth copy, and the printed sheets are discharged in the first discharge mode. Next, a printing failure is detected in a sheet P36 that is the second page of the fourth copy. The failure sheet P36 is discharged, in the second discharge mode, to a discharge position which is different from the discharge position to which the printed sheet P35 was discharged. After that, printing is performed normally up to a sheet P37 that is the sixth page of the fourth copy, and the printed sheets are discharged in the first discharge mode. Next, the same page as the failure sheet P36 is reprinted, and a reprinted sheet P38 is discharged, in the third discharge mode, to a discharge position which is different from the discharge positions to which the failure sheet P36 and the printed sheet P37 were discharged. The series of printing operations ends at the point in time when the sixth sheet of the fifth copy is discharged.

The user can obtain a complete bundle of the second copy by extracting the sheets of each copy from a single bundle of stacked sheets, removing the failure sheet P31 from 7 sheets of the second copy, using the shift discharge as a hint, and placing the reprinted sheet P33 at the same location. Likewise, the user can obtain a complete bundle of the fourth copy by removing the failure sheet P36 from 7 sheets of the fourth copy, and placing the reprinted sheet P38 at the same location. With switching of the discharge mode and the timing of reprinting, it is possible to significantly reduce the effort of replacing a sheet if a printing failure is detected. Also, the printed sheets other than the failure sheets are not removed, and thus the number of waste sheets is also minimized.

FIG. 5 shows an example in which all of the sheets including the first to fifth copies are discharged to the same tray (for example, the tray T1), but the tray used as the discharge destination may be changed, for example, for each copy.

The discharge control described above may be implemented by cooperation between, for example, the discharge unit 132 of the discharge apparatus 30, the detection unit 124 of the verification apparatus 20, and the printer unit 107 of the multi-function peripheral 10. For example, the printer unit 107 transmits control signals indicating which page of which copy has been printed to the detection unit 124 and the discharge unit 132. The detection unit 124 may compare, based on the control signals, each read image with the image of the sample data of the same page. Also, the detection unit 124 transmits a control signal indicating the detection result of a printing failure for each printed sheet to the printer unit 107 and the discharge unit 132. The discharge unit 132 determines, based on the control signal, to which discharge destination 35 and in which discharge mode each individual sheet should be discharged. Reprinting of the page which a printing failure was detected may be performed in response to a request from the discharge unit 132 to the printer unit 107, or from the detection unit 124 to the printer unit 107.

Figure 6:
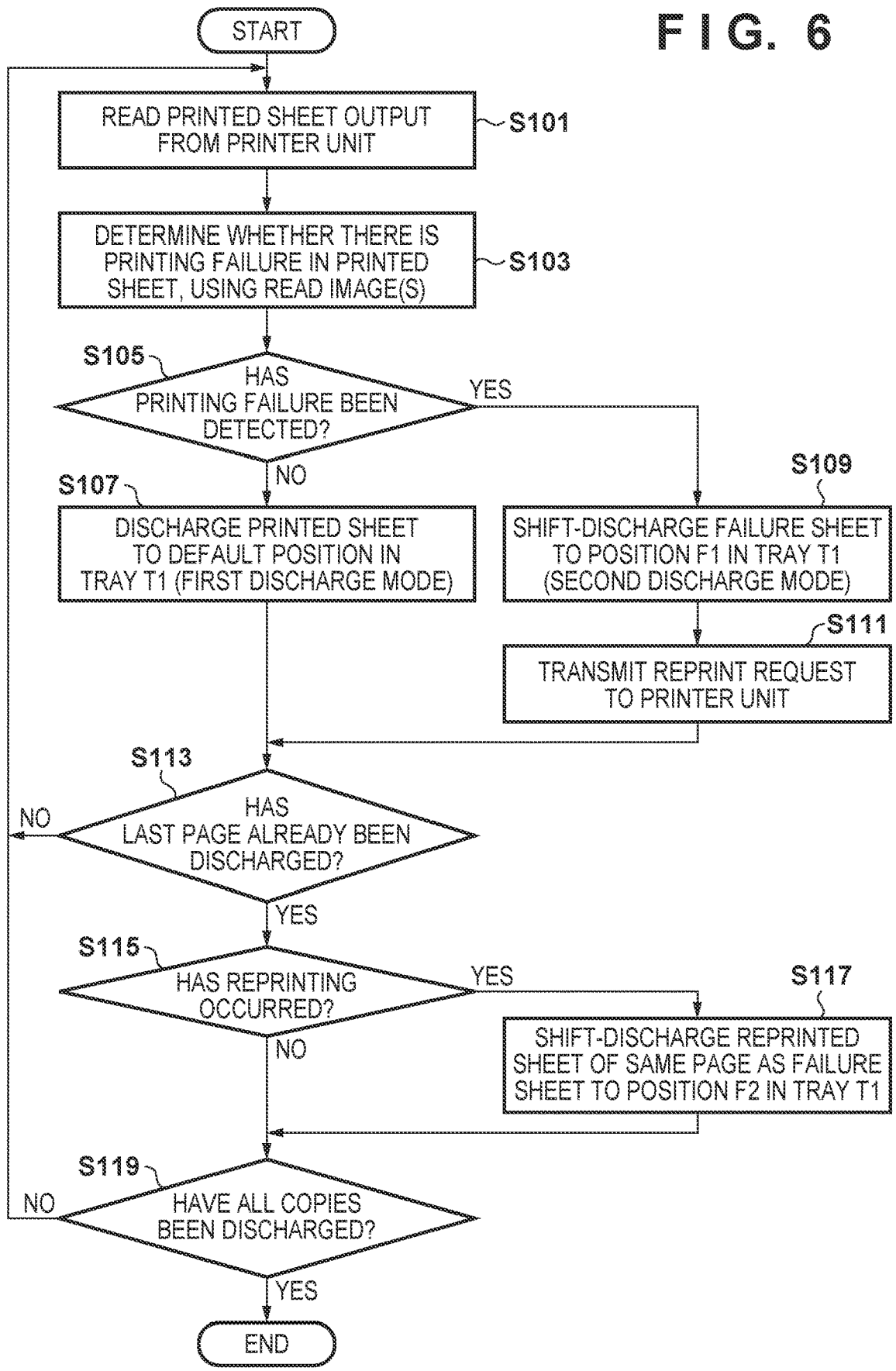
FIG. 6 is a flowchart illustrating an example of a flow of discharge control processing according to the first embodiment example.

FIG. 6 is a flowchart illustrating an example of a flow of discharge control processing according to the first embodiment example. In the description given below, processing steps will be referred to simply as S (step).

First, in S101, the second reader unit 122 of the verification apparatus 20 obtains a read image by reading one printed sheet printed by the printer unit 107 of the multi-function peripheral 10.

Next, in S103, the detection unit 124 determines whether there is a printing failure in the printed sheet, using the read image(s) obtained in S101. The subsequent processing branches (S105) depending on whether or not a printing failure has been detected in S103. If a printing failure is not detected, the processing proceeds to S107. On the other hand, if a printing failure is detected, the processing proceeds to S109.

If a printing failure is not detected, in S107, the discharge unit 132 performs an operation in the first discharge mode and discharges the printed sheet to a default discharge position in the tray T1. On the other hand, if a printing failure is detected, in S109, the discharge unit 132 performs an operation in the second discharge mode and discharges the failure sheet to a discharge position F1 in the tray T1. Also, in S111, the detection unit 124 transmits a request to reprint the same page as the failure sheet to the printer unit 107. In response to the reprint request, the printer unit 107 reprints the same page as the failure sheet immediately after the last page of the same copy has been printed.

After S107 or S111, the processing branches (S113) depending on whether or not the last page of the copy being printed has already been discharged. If the last page has not been discharged, the processing returns to S101, where, for a printed sheet of a subsequent page, the operations of obtaining a read image, detecting a printing failure, and discharging based on a detection result are repeated.

If the last page of the copy being printed has already been discharged, in S115, the discharge unit 132 determines whether or not reprinting has occurred in the printed copy. If it is determined that reprinting has occurred, the discharge unit 132 performs an operation in the third discharge mode and discharges a reprinted sheet of the same page as the failure sheet to a discharge position F2 in the tray T1.

The processing operations described above are repeated until printed sheets of all of the pages of all of the copies are discharged (S119). If printed sheets of all of the pages of all of the copies have been discharged (including reprinted sheets), the discharge control processing shown in FIG. 6 ends.

(2) Modified Example

In the case where high-speed printing is performed, a situation may occur in which printing of a copy subsequent to the copy in which a printing failure has occurred has already started before the reprint request transmitted in S111 in FIG. 6 reaches the printer unit 107. In particular, if there is a printing failure in the last page (or a page close thereto) of a copy, reprinting may not be performed at the end of printing of the copy.

To address this, as a modified example of the first embodiment example, in the case where printing of the (N+1)th copy has already started at the time when a printing failure in the N-th copy is detected, the discharge unit 132 may switch the discharge destination for the (N+1)th copy to a discharge destination 35 different from the discharge destination for the N-th copy. That is, in this case, the discharge unit 132 may discharge a reprinted sheet of the N-th copy to the first discharge destination that is the destination originally designated after one or more printed sheets of the (N+1)th copy has been discharged to the second discharge destination.

Figure 7:
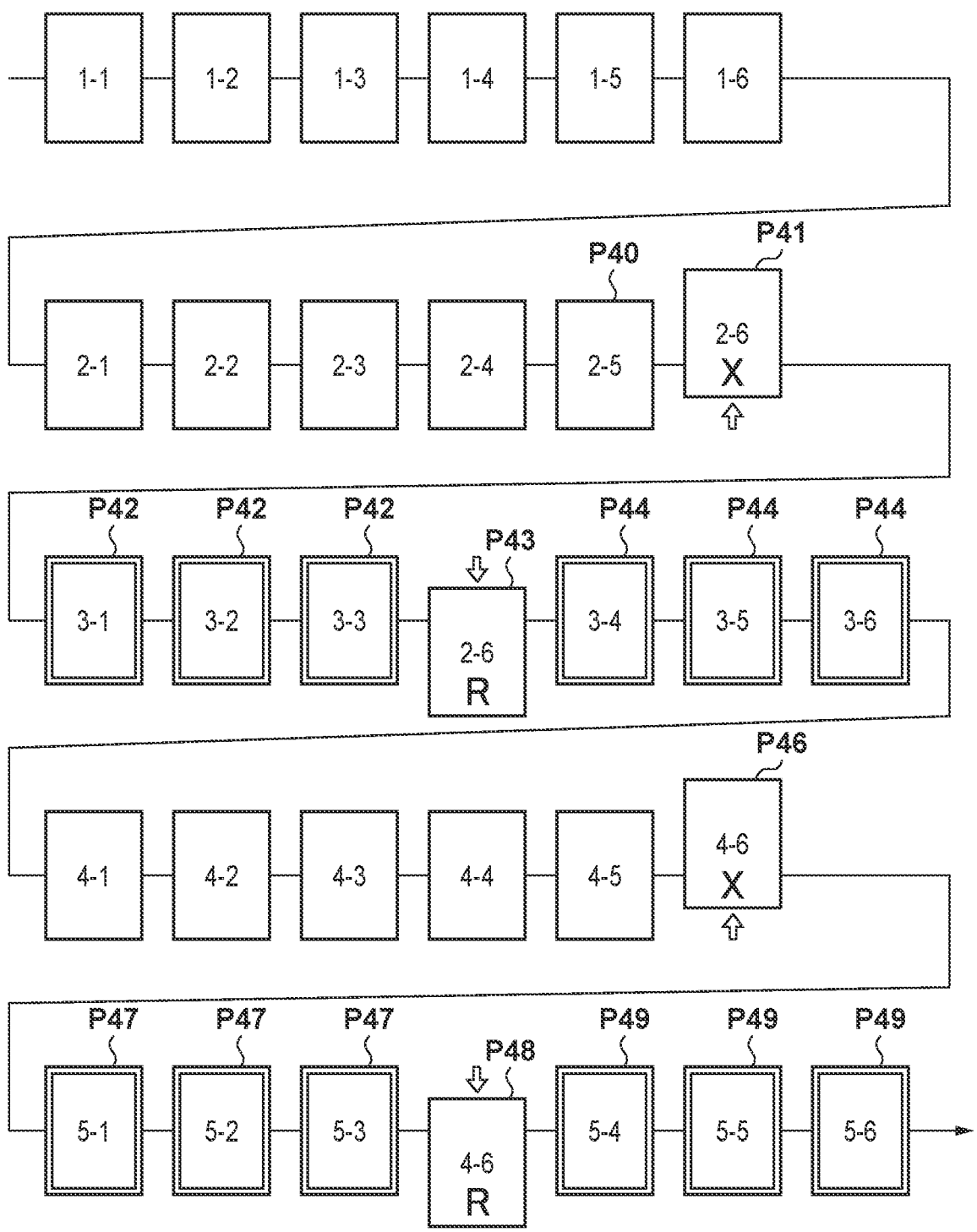
FIG. 7 is an illustrative diagram showing an example of a sheet discharge order and a discharge mode according to a modified example of the first embodiment example.

FIG. 7 shows an example of a sheet discharge order and a discharge mode according to the present modified example. In the example shown in FIG. 7 as well, it is assumed that a print target including a total of 6 pages is printed to make 5 copies. First, printing is performed normally up to a sheet P40 that is the fifth page of the second copy, and the printed sheets are discharged to a default discharge position in the tray T1. Next, a printing failure is detected in a sheet P41 that is the sixth page of the second copy. The failure sheet P41 is shift-discharged to a discharge position different from the default discharge position in the tray T1. At this point in time, printing of sheets P42 that are the first to third pages of the third copy has started, and the three sheets P42 are normally printed and discharged to a default discharge position in the tray T2. Next, the same page as the failure sheet P41 is reprinted, and a reprinted sheet P43 is shift-discharged to the tray T1 in a shift direction different from that of the failure sheet P41. Next, sheets P44 that are the remaining fourth to sixth pages of the third copy are printed and discharged to the default discharge position in the tray T2.

Next, sheets that are the first to fifth pages of the fourth copy are normally printed, and the printed sheets are discharged to the default discharge position in the tray T1. Next, a printing failure is detected in a sheet P46 that is the sixth page of the fourth copy. The failure sheet P46 is shift-discharged to a discharge position different from the default discharge position in the tray T1. At this point in time, printing of sheets P47 that are the first to third pages of the fifth copy has started, and the three sheets P47 are normally printed and discharged to the default discharge position in the tray T2. Next, the same page as the failure sheet P46 is reprinted, and a reprinted sheet P48 is shift-discharged to the tray T1 in a shift direction different from that of the failure sheet P46. Next, sheets P49 that are the remaining fourth to sixth pages of the fifth copy are printed and discharged to the default discharge position in the tray T2.

As a result of the discharge control shown in FIG. 7, bundles of printed sheets of the first, second, and fourth copies are output to the tray T1 without missing sheets, although failure sheets are included. Also, bundles of printed sheets of the third and fifth copies are output to the tray T2 without missing sheets. The user can obtain complete bundles of the second and fourth copies by extracting the sheets of each copy from the bundle of stacked sheets in the tray T1 and replacing failure sheets with reprinted sheets using the shift discharge as a hint. Also, the user can obtain complete bundles of the third and fifth copies by simply dividing the bundle of stacked sheets in the tray T2. By switching between the discharge modes as described above, even in the case where high-speed printing is performed, it is possible to both achieve a reduction in the effort of replacing a sheet if a printing failure is detected and minimization of the number of waste sheets.

(3) Second Embodiment Example

In a second embodiment example, the discharge apparatus 30 uses one of the three discharge destinations 35 as a discharge destination for failure sheets. The first discharge mode is a mode in which sheets are discharged to a first discharge destination, and the second discharge mode is a mode in which sheets are discharged to a second discharge destination for failure sheets that is different from the first discharge destination. That is, failure sheets are discharged to the second discharge destination. Also, in the case where M copies (where M>1) are designated for printing, if a printing failure is detected while the N-th copy (where N<M) is being discharged, the discharge apparatus 30 discharges printed sheets of the remaining pages of the N-th copy printed after the failure sheet in a third discharge mode. The third discharge mode is a mode in which sheets are discharged to a third discharge destination that is different from the first discharge destination and the second discharge destination.

In this embodiment example, as a result of sorting performed upon detection of a printing failure as described above, there will be bundles of sheets of an incomplete copy temporarily present in the respective first and third discharge destinations. Accordingly, the discharge apparatus 30 distributes printed sheets that are subsequently printed to the first discharge destination and the third discharge destination so as to supplement missing pages of each individual copy.

Specifically, the discharge unit 132 discharges additional printed sheets of missing pages (typically, failure detection pages and the remaining pages) of a copy in the first discharge destination to the first discharge destination. Discharging the additional printed sheets to the first discharge destination may include discharging reprinted sheets of the failure detection pages and printed sheets on which the same pages as the remaining pages are printed in the order of the page numbers thereof. For example, it is assumed that the total number of pages of one copy is represented by $p_{max}$, and a printing failure is detected in the p-th page. The pages from the p-th page to the $p_{max}$-th page are missing in the copy in the first discharge destination, and printed sheets of these pages (p, p+1, . . . , and $p_{max}$) may be discharged supplementarily to the first discharge destination. Accordingly, a complete bundle of printed sheets of the N-th copy can be discharged such that the printed sheets are stacked correctly in the order of the page numbers thereof in the first discharge destination.

Also, the discharge unit 132 discharges additional printed sheets of pages other than the remaining pages (typically, failure detection pages and the preceding pages thereof) in the third discharge destination to the third discharge destination. Discharging the additional printed sheets to the third discharge destination may include discharging printed sheets on which the same pages as the preceding pages and the failure detection pages are printed in the order of the page numbers thereof. The pages from the first page to the p-th page are temporarily missing in the third discharge destination, and printed sheets of these pages (1, 2, . . . , and p) may be discharged supplementarily to the third discharge destination. Accordingly, another complete bundle of printed sheets are discharged to the third discharge destination, and this can be handled as a bundle of the (N+1)th copy.

Figure 8:
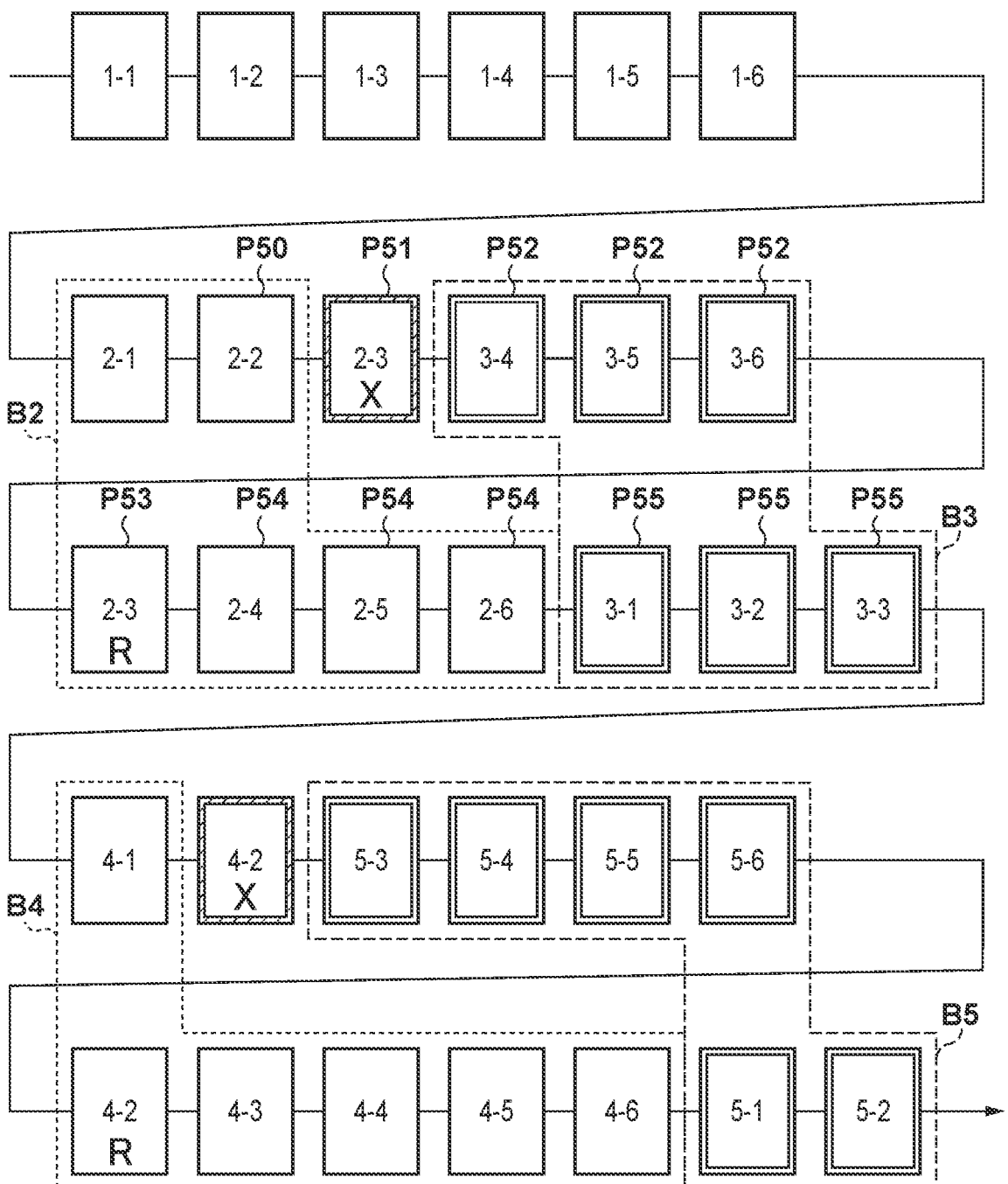
FIG. 8 is an illustrative diagram showing an example of a sheet discharge order and a discharge mode according to a second example.

FIG. 8 shows an example of a sheet discharge order and a discharge mode according to the second example. In the example shown in FIG. 8 as well, it is assumed that a print target including a total of 6 pages is printed to make 5 copies. First, printing is performed normally up to a sheet P50 that is the second page of the second copy, and the printed sheets are discharged to the tray T1. Next, a printing failure is detected in a sheet P51 that is the third page of the second copy. The failure sheet P51 is discharged to the tray T3 for failure sheets. After that, sheets P52 that would be the fourth to sixth pages of the second copy, which are the remaining pages, are printed normally, and the printed sheets P52 are discharged to the tray T2. Next, the same page as the failure sheet P51 is reprinted, and a reprinted sheet P53 is discharged to the tray T1. Also, the same pages as the remaining pages are further printed, and printed sheets P54 are discharged to the tray T1. Furthermore, the same pages as the preceding pages and the failure detection page are further printed, and printed sheets P55 are discharged to the tray T2.

At this point in time, a complete bundle of printed sheets of the first to sixth pages (including the reprinted sheet P53) are discharged in the tray T1 in the correct order of the page numbers of the printed sheets, and the user can handle it as a bundle B2 of the second copy. Also, a complete bundle of printed sheets of the fourth to sixth pages and the first to third pages are discharged in the tray T2, and the user can handle it as a bundle B3 of the third copy. The user is required to arrange the printed sheets of the fourth to sixth pages and the printed sheets of the first to third pages of the bundle B3 in the correct order of the page numbers thereof, but the burden of this operation is smaller than the operation of finding a failure sheet. In order to inform the user of the need to perform the operation of arranging the printed sheets, the discharge position of the printed sheets P55 of the missing pages that are supplementarily discharged may be shifted relative to the discharge position of the sheets P52.

In the example shown in FIG. 8, after that, a printing failure is also detected in a sheet that is the second page of the fourth copy. However, by sorting and supplementing a missing page in the same manner as described above, a complete bundle B4 of the fourth copy can be discharged to the tray T1, and a complete bundle B5 of the fifth copy can be discharged to the tray T2. In this case as well, the user is only required to arrange the printed sheets of the third to sixth pages and the printed sheets of the first to second pages of the bundle B5 in the correct order of the page numbers thereof.

FIG. 9 is a flowchart illustrating an example of a flow of discharge control processing according to the second example.

First, in S201, the second reader unit 122 of the verification apparatus 20 obtains a read image by reading one printed sheet printed by the printer unit 107 of the multifunction peripheral 10.

Next, in S203, the detection unit 124 of the verification apparatus 20 determines whether there is a printing failure in the printed sheet, using the read image(s) obtained in S201. The subsequent processing branches (S205) depending on whether or not a printing failure has been detected in S203. If a printing failure is not detected, the processing proceeds to S207. On the other hand, if a printing failure is detected, the processing proceeds to S213.

Furthermore, if a printing failure is not detected, the processing branches (S207, S209) depending on the operation state of the system. If the system is performing a normal operation, the processing proceeds to S211. As used herein, the normal operation means an operation performed under normal conditions that is different from the operation of diverting to a different tray performed upon detection of a printing failure, and different from an operation of clearing (supplementing) an incomplete state that temporarily occurs as a result of the diverting operation. On the other hand, if the system is performing the diverting operation, the processing proceeds to S217. If the system is performing the operation of clearing the incomplete state, the processing proceeds to S219.

In the normal operation, in S211, the discharge unit 132 performs an operation in the first discharge mode and discharges the printed sheet to the tray T1.

Also, in response to a printing failure being detected, in S213, the discharge unit 132 performs an operation in the second discharge mode and discharges the failure sheet to the tray T3. Also, in S215, the detection unit 124 transmits a request to reprint the same page as the failure sheet to the printer unit 107. In response to the reprint request, the printer unit 107 executes printing in the order described with reference to FIG. 8 for clearing the incomplete state after the last page of the same copy has been printed.

In the diverting operation, in S217, the discharge unit 132 performs an operation in the third discharge mode and discharges printed sheets of the remaining pages printed after the failure sheet to the tray T3.

If the operation of clearing the incomplete state is being performed, in S219, the discharge unit 132 determines, based on the page number of the failure detection page and the page number of the printed sheet being processed, the discharge destination (the tray T1 or the tray T2) for the printed sheet. Then, in S221, the discharge unit 132 discharges the printed sheet to the determined discharge destination.

The processing operations described above are repeated until printed sheets of all of the pages of all of the copies are discharged (S223). If printed sheets of all of the pages of all of the copies have been discharged (including reprinted sheets), the discharge control processing shown in FIG. 9 ends.

The modified example described in connection to the first embodiment example with reference to FIG. 7 may be applied to the second example. In this case, printed sheets of a subsequent copy for which printing has already started at the time when a printing failure is detected may be discharged to a different discharge destination (for example, a tray T4 not shown in FIG. 1), and then, the operation of clearing the incomplete state including discharging reprinted sheets may be performed. After that, the remaining printed sheets may be continuously discharged to a different discharge destination.

4. Conclusion

In the embodiment given above, in a system that detects a printing failure using read images of printed sheets and discharges each printed sheet in a mode that depends on the detection result, one or more printed sheets are discharged to a first discharge destination in a first discharge mode until a printing failure is detected. Then, in response to a printing failure being detected, the failure sheet is discharged in a second discharge mode, and a reprinted sheet on which the same page as the failure sheet is printed is discharged to the first discharge destination. With this configuration, the user can easily find the failure sheet based on the difference in the discharge mode. Also, the user can obtain a complete bundle of printed sheets of the same copy including the reprinted sheet from the first discharge destination, without difficulty. Also, the printed sheets other than the failure sheet are not removed, and thus the number of waste sheets is also minimized.

Also, in an embodiment example, the first discharge mode is a mode in which sheets are discharged to a first discharge position in the first discharge destination, and the second discharge mode is a mode in which sheets are discharged to a second discharge position shifted from the first discharge position in the first discharge destination. With this configuration, the user can easily find a failure sheet in the same discharge destination, using the shift discharge as a hint, and remove the failure sheet, and also can intuitively figure out where a reprinted sheet should be inserted.

As an example, the reprinted sheet may be discharged in a third discharge mode. The third discharge mode may be a mode in which sheets are discharged to a third discharge position shifted from the first discharge position in a direction or by a shift amount different from the second discharge position. With this configuration, the user can distinguish the reprinted sheet from the failure sheet in the same discharged destination using the shift discharge as a hint, and easily find the reprinted sheet.

As another example, if a printing failure is detected while the N-th copy (where N<M) is being discharged during printing of M copies (where M>1), the reprinted sheet may be discharged immediately after discharging a printed sheet of the last page of the N-th copy. With this configuration, even if a printing failure occurs, the user can simply extract the sheets of each copy from a bundle of stacked sheets and obtain each complete copy by performing a separate operation for the each individual copy. Also, the printing timing is not significantly different between sheets that constitute each individual copy, and thus the print color or the print density does not significantly vary in the same copy, which prevents giving the user an impression of unnatural print quality.

Also, according to a modified example, if printing of a subsequent copy has already started at the time when a printing failure is detected, one or more printed sheets of the subsequent copy are discharged to the second discharge destination, and thereafter, a reprinted sheet on which the same page as the failure sheet is printed is discharged to the first discharge destination. With this configuration, even at the time when a printing failure is detected during high-speed printing, the order of printed sheets of a copy does not vary in each individual discharge destination, and thus the effort of replacing a sheet can be significantly reduced, and waste sheets can also be prevented.

Also, according to an embodiment example, the first discharge mode is a mode in which sheets are discharged to a first discharge destination, and the second discharge mode is a mode in which sheets are discharged to a second discharge destination for failure sheets that is different from the first discharge destination. With this configuration, the user's effort in removing a failure sheet from a bundle of printed sheets is eliminated. Also, if a printing failure is detected during printing of M copies (where M>1), printed sheets of the remaining pages printed after the failure sheet are diverted to the third discharge destination, and thereafter, missing pages in the first discharge destination and the third discharge destination are further printed, and printed sheets of the missing pages are supplemented to the first discharge destination and the third discharge destination, respectively. With this configuration, the user can obtain complete bundles of printed sheets of two copies from the first discharge destination and the third discharge destination. In particular, in the case where printed sheets supplemented to each individual discharge destination are discharged in the order of the page numbers thereof, the user is required to only once change the order of sheets of the bundle of sheets obtained from the third discharge destination.

5. Variations

The present invention is not limited to the embodiment given above, and may be modified in various ways. For example, in the embodiment given above, examples have been mainly described in which the technique according to the present disclosure is applied to a post-processing system 40 that is connected to a multi-function peripheral 10, or a discharge system 1 that is an image forming system including a multi-function peripheral 10 and a post-processing system 40. However, an independent multi-function peripheral 10 (or an image forming apparatus similar thereto) may have the same functions as a verification apparatus 20 and a discharge apparatus 30 described above. Such an apparatus may also be interpreted as a type of discharge system or image forming system.

Also, in the embodiment given above, examples have been described in which some operations are left for the user to obtain a desired bundle of printed sheets, but one or more of the operations may be automated by a system. For example, in the second example, if a mechanism that automatically arranges the order of printed sheets discharged to the tray T2 is introduced, the user only needs to perform an operation of extracting a bundle of sheets from each tray in the second example.

Also, in the flowcharts, the flows of discharge control processing of determining in which discharge mode each printed sheet is to be discharged have been described mainly from the viewpoint of the discharge apparatus 30. However, the discharge control processing may be implemented in such a manner that a certain apparatus causes the discharge apparatus 30 to perform the described discharging steps. For example, the CPU 101 of the multi-function peripheral 10 or a processor included in the verification apparatus 20 may perform the discharge control processing. Alternatively, a computer program (or a non-transitory computer-readable storage medium in which the program is stored) for causing a processor in a system to perform the discharge control processing may be provided.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-143312, filed on Aug. 2, 2019 which is hereby incorporated by reference herein in its entirety.

What is claimed is:

1. An image forming system comprising:
   a printer which prints an image on a recording sheet, in a predetermined page order for a print job including a plurality of pages;
   at least one discharge tray;
   a reader which reads the image printed on the recording sheet; and
   one or more controllers including one or more processors and one or more memories, the one or more controllers being configured to:
   determine whether or not there is a printing failure for the image read by the reader,
   when it is determined that there is no printing failure for the read image, control discharging of the printed sheet such that the printed sheet is discharged to a first discharge position on a first discharge tray of the at least one discharge tray, and when it is determined that there is the printing failure for the read image, control discharging of the printed sheet such that the printed sheet is discharged to a second discharge position on the first discharge tray, the second discharge position being shifted from the first discharge position in a first direction, control the printer to reprint the image onto a recording sheet and by interrupting the predetermined page order, and control discharging of the reprinted sheet such that the reprinted sheet is discharged to a third discharge position on the first discharge tray and by interrupting the predetermined page order, the third discharge position being different from the first discharge position and the second discharge position and the third discharge position being shifted from the first discharge position in a second direction that is different from the first direction.

2. The image forming system according to claim 1, wherein the second direction is opposite to the first direction.

3. The image forming system according to claim 1, wherein the at least one discharge tray includes the first discharge tray and a second discharge tray.

4. The image forming system according to claim 3, wherein the one or more controllers are configured to in the case where M copies (where M>1) are designated for printing, if the printing failure is detected while N-th copy (where N<M) is being discharged, and printing of (N+1)th copy has already started, discharge one or more printed sheets of the (N+1)th copy to the second discharge tray, and thereafter discharge the reprinted sheet for the N-th copy to the third discharge position on the first discharge tray.

5. The image forming system according to claim 1, wherein the one or more controllers are configured to in the case where M copies (where M>1) are designated for printing, if the printing failure is detected while N-th copy (where N<M) is being discharged, discharge the reprinted sheet immediately after discharging a printed sheet of the last page of the N-th copy.

6. A method for controlling discharge in an image forming system that includes: a printer, a reader, and at least one discharge tray, the method comprising:

printing, by the printer, an image on a recording sheet, in a predetermined page order for a print job including a plurality of pages;

reading the image printed on the recording sheet;

determining whether or not there is a printing failure for the image read by the reader;

when it is determined that there is no printing failure for the read image, controlling discharging of the printed sheet such that the printed sheet is discharged to a first discharge position on a first discharge tray of the at least one discharge tray; and when it is determined that there is the printing failure for the read image, controlling discharging of the printed sheet such that the printed sheet is discharged to a second discharge position on the first discharge tray, the second discharge position being shifted from the first discharge position in a first direction, controlling the printer to reprint the image onto a recording sheet and by interrupting the predetermined page order, and controlling discharging of the reprinted sheet such that the reprinted sheet is discharged to a third discharge position on the first discharge tray and by interrupting the predetermined page order, the third discharge position being different from the first discharge position and the second discharge position and the third discharge position being shifted from the first discharge position in a second direction that is different from the first direction.

7. The method according to claim 6, wherein the second direction is opposite to the first direction.

8. The method according to claim 6, wherein the at least one discharge tray includes the first discharge tray and a second discharge tray.

9. The method according to claim 6, wherein in the case where M copies (where M>1) are designated for printing, if the printing failure is detected while N-th copy (where N<M) is being discharged, the reprinted sheet is discharged immediately after discharging a printed sheet of the last page of the N-th copy.

10. The method according to claim 6, wherein in the case where M copies (where M>1) are designated for printing, if the printing failure is detected while N-th copy (where N<M) is being discharged, and printing of (N+1)th copy has already started, the reprinted sheet for the N-th copy is discharged to the third discharge position on the first discharge tray after discharging one or more printed sheets of the (N+1)th copy to a second discharge tray other than the first discharge tray.

11. A non-transitory computer-readable storage medium having stored therein a computer program which, when executed by a processor of an image forming system comprising: a printer which prints an image on a recording sheet, in a predetermined page order for a print job including a plurality of pages, a reader which reads the image printed on the recording sheet, and at least one discharge tray, causes the processor to:

determine whether or not there is a printing failure for the image read by the reader, when it is determined that there is no printing failure for the read image, control discharging of the printed sheet such that the printed sheet is discharged to a first discharge position on a first discharge tray of the at least one discharge tray, and when it is determined that there is the printing failure for the read image, control discharging of the printed sheet such that the printed sheet is discharged to a second discharge position on the first discharge tray, the second discharge position being shifted from the first discharge position in a first direction, control the printer to reprint the image onto a recording sheet and by interrupting the predetermined page order, and control discharging of the reprinted sheet such that the reprinted sheet is discharged to a third discharge position on the first discharge tray and by interrupting the predetermined page order, the third discharge position being different from the first discharge position and the second discharge position and the third discharge position being shifted from the first discharge position in a second direction that is different from the first direction.

* * * * *